(12) United States Patent
Guime et al.

(10) Patent No.: US 9,846,908 B2
(45) Date of Patent: Dec. 19, 2017

(54) SMART COMPLETE OPTION STRATEGY DISPLAY

(71) Applicants: Freddy Guime, Aurora, IL (US); Victor Glava, Chicago, IL (US); Robert Kallay, Chesterton, IN (US)

(72) Inventors: Freddy Guime, Aurora, IL (US); Victor Glava, Chicago, IL (US); Robert Kallay, Chesterton, IN (US)

(73) Assignee: OptionsCity Software, Inc., Chicago, IL (US)

( * ) Notice: Subject to any disclaimer, the term of this patent is extended or adjusted under 35 U.S.C. 154(b) by 48 days.

(21) Appl. No.: 13/739,542

(22) Filed: Jan. 11, 2013

(65) Prior Publication Data

US 2014/0201050 A1 Jul. 17, 2014

(51) Int. Cl.
*G06Q 40/00* (2012.01)
*G06Q 40/04* (2012.01)

(52) U.S. Cl.
CPC .................. *G06Q 40/04* (2013.01)

(58) Field of Classification Search
CPC ........ G06Q 40/00; G06Q 40/02; G06Q 40/04; G06Q 40/06; G06Q 10/025
USPC ..................................................... 705/35–45
See application file for complete search history.

(56) References Cited

U.S. PATENT DOCUMENTS

| | | | |
|---|---|---|---|
| 7,689,498 B2* | 3/2010 | Rodgers et al. ................ 705/37 |
| 2008/0270321 A1* | 10/2008 | Nordlicht et al. .......... 705/36 R |
| 2011/0178953 A1 | 7/2011 | Johannes | |
| 2012/0054084 A1 | 3/2012 | Wolf et al. | |
| 2012/0084082 A1 | 4/2012 | Al-Saadi | |

* cited by examiner

*Primary Examiner* — Kirsten Apple
*Assistant Examiner* — Mike Anderson
(74) *Attorney, Agent, or Firm* — Loeb & Loeb, LLP

(57) ABSTRACT

A system and method for determining and presenting likely option strategies based on inputs is disclosed. An assets input is accepted where the asset input indicates an underlying asset for which options are available. Additional inputs may be accepted to further narrow the list of possible strategies. The system may attempt to predict and display the most likely option strategies based on the inputs.

20 Claims, 8 Drawing Sheets

SMART COMPLETE OPTION STRATEGY DISPLAY

Trading exchanges historically provided a location for buyers and sellers to meet to trade stocks, bonds, currencies, commodities, and other items. The New York Stock Exchange and the Chicago Mercantile Exchange are examples of such trading exchanges. Recent advances in computer and communications technology have led to electronic trading exchange system networks. Electronic trading exchange system networks use communications networks and computers to replicate traditional face-to-face exchange functions. For example, centralized exchange computers disseminate market information, maintain records and statistics, settle cash payments, determine risk based margin requirements, and match trades. Matching of trades is typically done on a first come-first served basis, whereby time of order entry is an important criterion for determining priority in fulfillment of a transaction.

A communications network connects the exchange computers to numerous trader sites. Each trader site includes one or more trader stations operated by traders. Exchange network operators typically provide exchange members with interface software and, in some cases, hardware to enable traders to view prices and other information relating to products, and to execute transactions by submitting orders and quotes. This trading information is displayed in a grid or other organized format. Market competition is fierce. Traders who can quickly identify opportunities and act on them generate the largest profits.

Most trader stations in use today rely upon the traders themselves to decide whether to submit an order in response to a trading opportunity presented through the exchange. In this regard, the trading information is received from the exchange, processed, and displayed on a monitor of the trader's station. The trader reads the trading information from the monitor and decides whether or not to submit an order. The trader submits an order by entering instructions into the trader station using a keyboard or mouse.

Attempts have been made to implement trading systems that automate decision-making so that orders may be submitted with limited trader interaction. These systems have a number of drawbacks. For example, user-friendly systems that automatically submit orders without trader interaction, while faster than a human trader, are relatively slow in terms of computer speed due to application and system design. In a typical set-up, trading information received from the exchange is processed by general purpose backend computer equipment. The backend computer may, among other things, (1) act as a gateway by communicating to market information from the exchange to various types of client equipment, (2) submit, delete, and modify orders and quotes to the exchange from the various client equipment, (3) receive real-time trade confirmations and end-of-day back office reports, and (4) perform risk analysis, position management, and accounting functions. The trader stations are clients of the backend computer. The trader stations may be tasked with numerous functions, such as (1) receiving and displaying real-time market information, (2) creating and displaying theoretical prices related to market products, (3) composing, submitting, modifying, and deleting orders and quotes, (4) maintaining positions and calculating risk management, to name a few. Each trader station is typically configured in a very user-friendly, Windows-based environment since the trader will spend long periods of time each day watching and interacting with it. The overhead associated with the functions performed by the backend computer and the trader stations reduces the response speed of automated trading.

In addition, computer equipment lacks the trading judgment of a human trader. A computer can generate staggering losses in the blink of an eye by submitting orders based upon incomplete or mistaken assumptions inherent in the trading program, erroneous input data, or corrupted data relied upon by the trading program. Accordingly, there exists a need in the art for an automated trading system that rapidly responds to trade information transmitted from an exchange, yet is safe and accurate.

For example, automated hedging may be used to hedge the vega risk, the risk of a position or trade due to price changes of the options arising from changes of an option's volatility.

SUMMARY

A system and method for determining and presenting likely option strategies based on inputs is disclosed. An assets input is accepted where the asset input indicates an underlying asset for which options are available. Available options may be displayed where available options include related available option data for the underlying asset. The option data may be selectable. A first selection may be accepted from the available option data. First possible options strategies may be determined that conform to the selected option data and probable strategies may be determined from the possible strategies. A first strategy prices may be determined for the probable first option strategies. A probable first possible option strategies and first strategy prices may be displayed where the probable first option strategies are selectable. A second selection may be accepted. If the second selection is of one of the probable first option strategies, additional information about the underlying options of the probable first option strategy may be displayed in an additional display. If the second selection is of one of the available option data, a second possible set of option strategies may be determined where the second possible option strategy requires the first selection and the second selection. A probable second option strategy from the second possible option strategies may be determined and second strategy prices for the second possible option strategies may be determined. The probable second possible option strategies and second strategy prices may be displayed where the probable second option strategies are selectable.

In the past, users may have had to piece together various options to create a strategy. As a result of the system and method, a user may only have to input a first option selection and the desired strategy may appear which the user can select. As the user enters more information on the desired options, the number of possible strategies may be reduced until the desired strategy is selected.

DESCRIPTION

Figure 1:
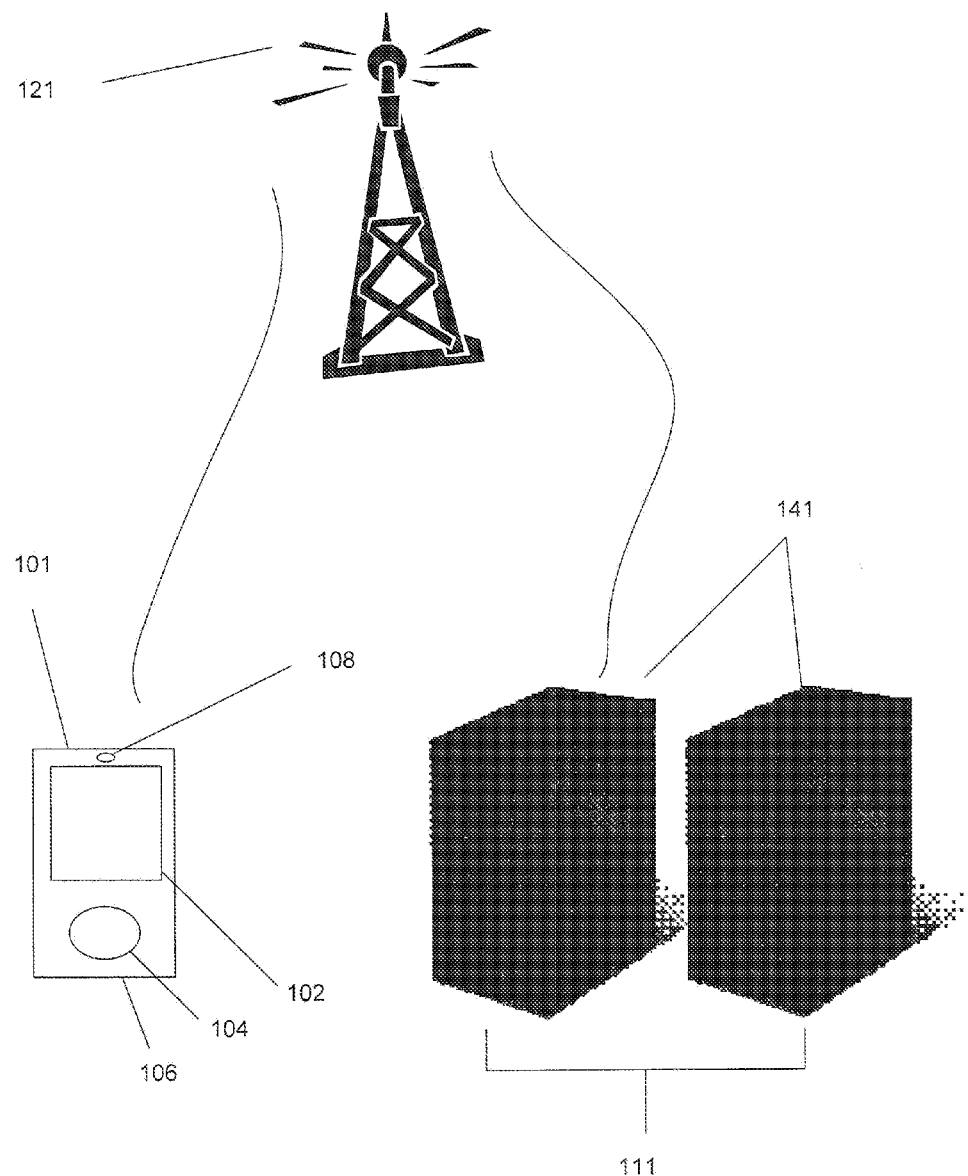
FIG. 1 is an illustration of a mobile computing device, a server type computer device and a communication device.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

Options are derivative securities whose values are a function of an underlying asset.

The price of an underlying asset for immediate purchase is called the spot price. A vanilla option on an (underlying) asset gives the buyer the right, but not the obligation, to buy (Call) or sell (Put) the underlying asset at the strike price. Where options are traded the price-maker prepares a bid price and an offer price. The bid price is the price at which the trader is willing to purchase the option and the offer price is the price at which the trader is willing to sell the option. The difference between the bid and offer prices is referred to as the bid-offer spread.

In the early 1970s Black and Scholes, and Merton, independently developed an option pricing model that is still in use today. The BSM model, as it is commonly known, provides unique closed form solutions for the price of European vanilla options. BSM found that by constructing and dynamically maintaining an option replication portfolio consisting of assets whose prices are known, they could obtain a precise option price by exploiting the no-arbitrage condition. Of course, other option pricing models exist and might be used as well.

The BSM model is limited in that it only values the convexity of the option delta with respect to the underlying asset price. Other crucial convexities in the real world are not priced by BSM models, such as vega and delta convexities to implied volatility. While attempts have been made to derive a model which endogenously values all key convexities, price-makers prefer the pragmatic approach of adjusting the BSM implied volatility to make the model work in practice. These adjustments are called smile and skew and are defined by vega neutral butterflies and risk reversals respectively.

A vega neutral butterfly is a trading strategy in which a strangle is purchased and a zero-delta straddle is sold, both with the same maturity date, such that the vega of the strategy starts at zero. A strangle is a trading strategy requiring the simultaneous purchase (or sale) of a Put option and a Call option, with identical face values and maturity dates but different strike prices, such that the delta of the strategy is equal to zero. A zero-delta straddle is a trading strategy requiring the simultaneous purchase (or sale) of a Put option and a Call option, with identical face values, maturity dates and strike prices, such that the delta of the strategy is equal to zero. A risk reversal is a trading strategy in which a Call (Put) option is purchased and a Put (Call) option is sold, where both have identical deltas, maturity date and face value.

The BSM methodology has been applied to exotic as well as vanilla payoffs, to obtain the theoretical value of exotic options. For example, American binary options are amongst the most heavily traded exotic foreign exchange (FX) options. Option risks are described by a set of partial derivatives commonly referred to as "the Greeks". Option Greeks include:

Delta: the amount that an option price will change given a small change in the price of the underlying asset. In other words it is the partial derivative of the option price which respect to the spot asset price; and Vega: the amount that an option price will change given a small change in volatility. In other words it is the partial derivative of the option price with respect to volatility.

There are other Option Greeks which may be displayed, either alone or in combination with delta and vega, along with a variety of market conditions or positions.

Computer System

FIG. 1 may be a high level illustration of some of the elements a sample computing system. The computing system may be a dedicated computing device 141, a dedicated portable computing device 101, an application on the computing device 141, an application on the portable computing device 101 or a combination of all of these. FIG. 1 may be a high level illustration of a portable computing device 101 communicating with a remote computing device 141 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 101 may be a device that operates using a portable power source 155 such as a battery. The portable computing device 101 may also have a display 102 which may or may not be a touch sensitive display. More specifically, the display 102 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data, a camera 108 to accept images and a speaker 110 to communicate sounds.

Figure 2:
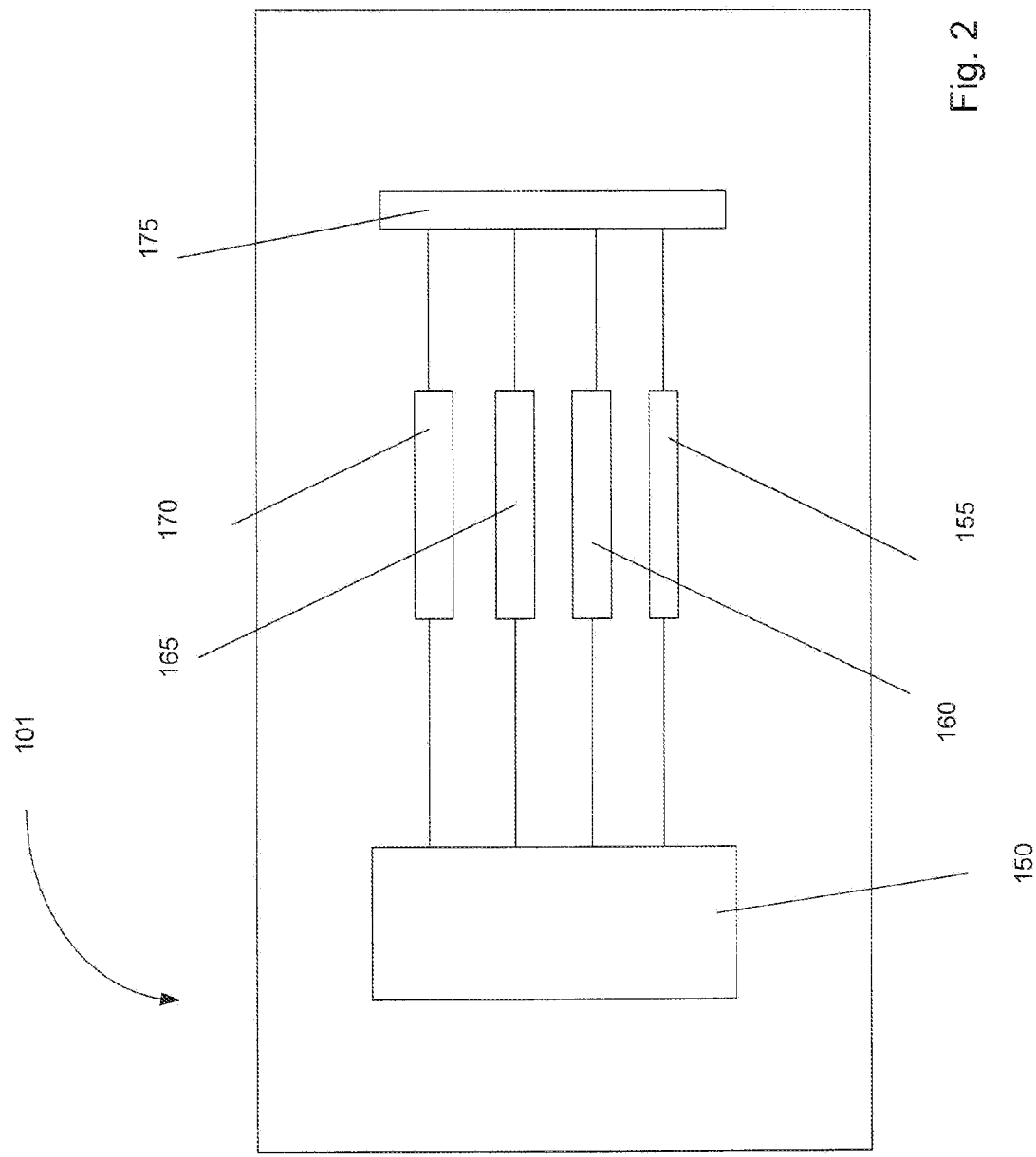
FIG. 2 is an illustration of a portable computing device.

The portable computing device 101 may be able to communicate with a computing device 141 or a plurality of computing devices 141 that make up a cloud of computing devices 111. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication network 121 such as cellular service, through the Internet, through a private network, through Bluetooth, etc. FIG. 2 may be a simplified illustration of the physical elements that make up a portable computing device 101 and FIG. 3 may be a simplified illustration of the physical elements that make up a server type computing device 141.

FIG. 2 may be a sample portable computing device 101 that is physically configured according to be part of the system. The portable computing device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computing device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computing device 101 and the number and types of portable computing devices 101 is limited only by the imagination. The portable computing device 101 may act as a dedicated device to implement the method or may be a part of a computing system.

Figure 3:
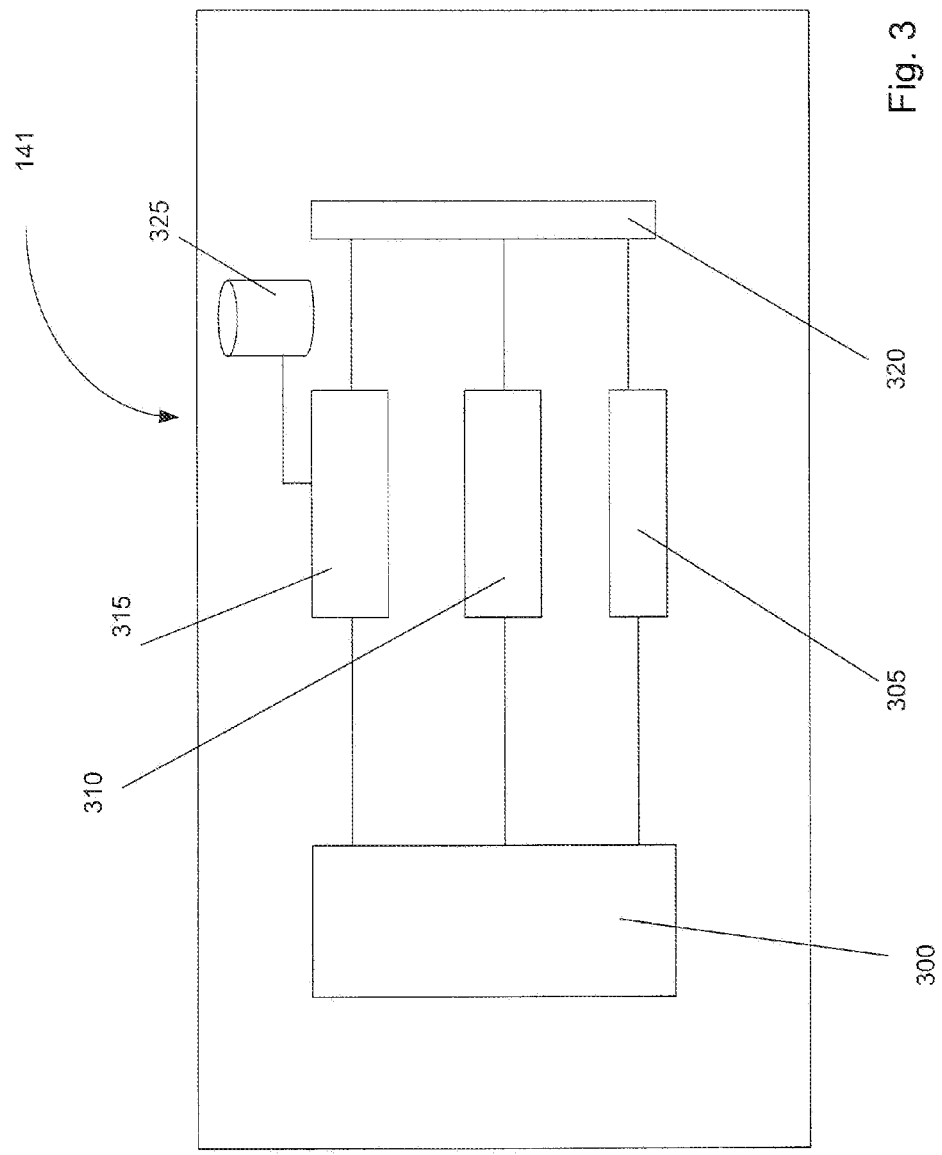
FIG. 3 is an illustration of a server type computing device.

The physical elements that make up the remote computing device 141 may be further illustrated in FIG. 3. At a high level, the computing device 141 may include a digital storage such as a magnetic disk, an optical disk, flash storage, non-volatile storage, etc. Structured data may be stored in the digital storage such as in a database. The computing device may be a type of server 141 and may have a processor 300 that is physically configured according to computer executable instructions. It may also have a sound and video module 305 which assists in displaying video and sound and may turn off when not in use to conserve power and battery life. The computing device 141 may also have volatile memory 310 and non-volatile memory 315.

The database 325 may be stored in the memory 310 or 315 or may be separate. The database 325 may also be part of a cloud 111 of computing devices 141 and may be stored in a distributed manner across a plurality of computing devices 141. There also may be an input/output bus 320 that shuttles data to and from the various user input devices such as the microphone 106, the camera 108, the inputs 102, etc. The input/output bus 320 also may control of communicating with the networks, either through wireless or wired devices. In some embodiments, the application may be on the local computing device 101 and in other embodiments, the application may be remote 141. Of course, this is just one embodiment of the computing device 141 and the number and types of portable computing devices 101 is limited only by the imagination.

Probable Strategies

Figure 4:
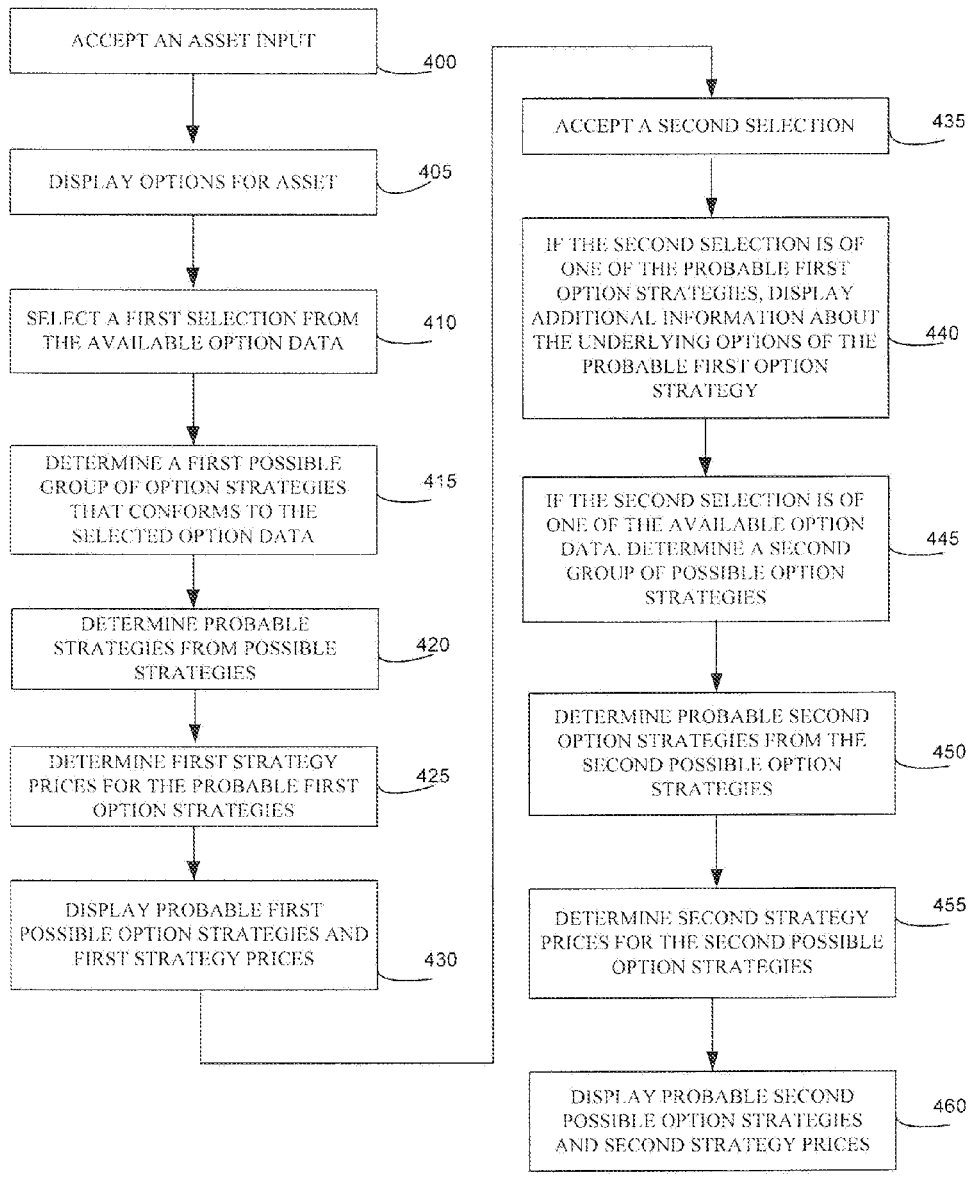
FIG. 4 is an illustration of a method for determining and presenting likely option strategies.

FIG. 4 may illustrate a general logic flow of determining and presenting likely option strategies based on inputs that may be implemented in computer executable instructions that physically configure a processor. As previously mentioned, the processor may be a single processor, a plurality of processors or any combination of processors. Further, the processors may be local, remote or a combination of local and remote such as in a cloud computing environment.

At block 400, an asset input may be accepted. The asset input may indicate an underlying asset for which options are available. A common example (and not limitation) of an asset may be an individual stock such as General Electric or a combination of stocks, such as the S&P 500. A number of symbols for available assets may be stored in selectable items 510 such that the relevant options may be quickly obtained.

Figure 5:
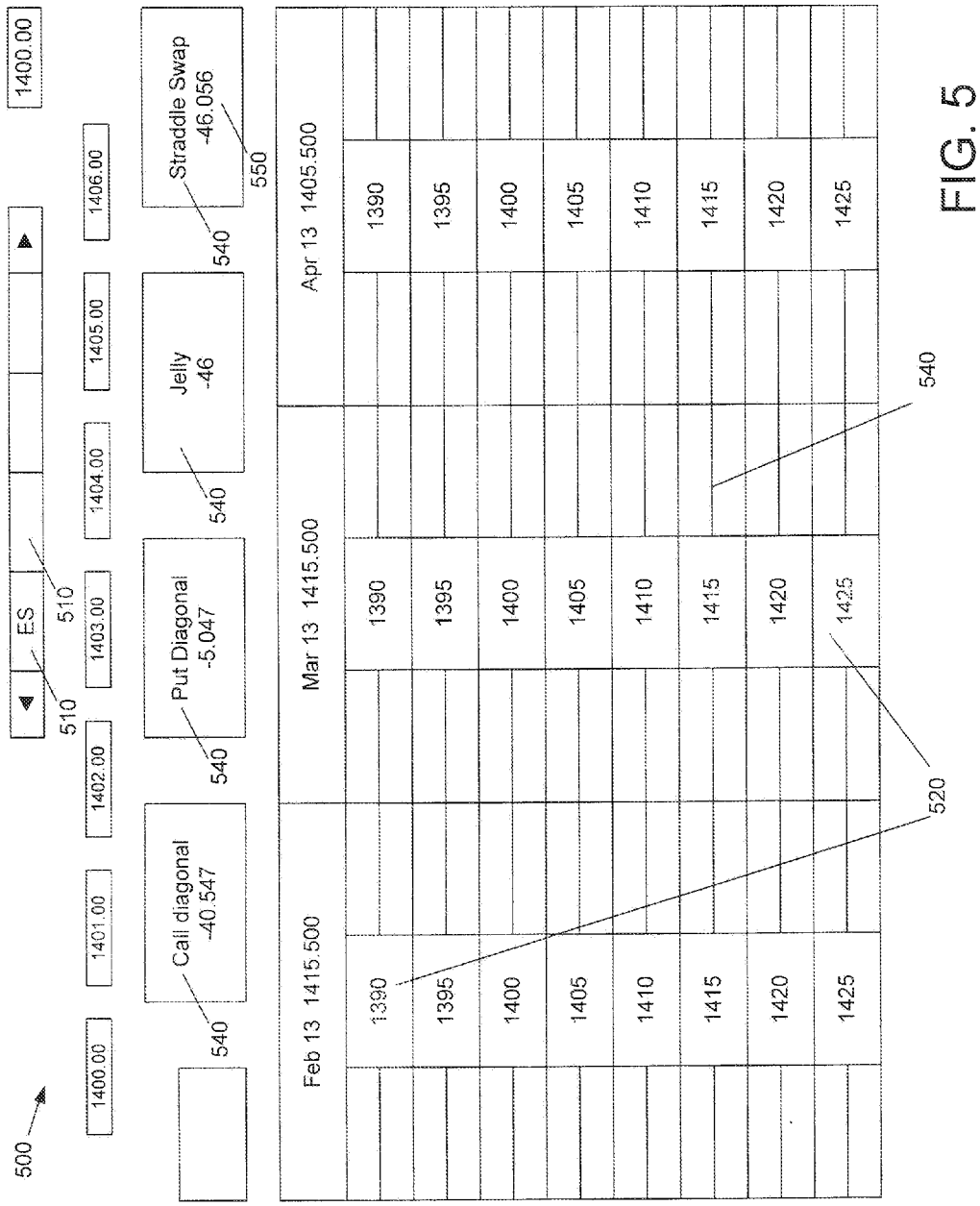
FIG. 5 illustrates the possible spreads (and theoretical values) at the top when 2 strikes are clicked on in different months.

At block 405, available options may be displayed. FIG. 5 may illustrate a sample display 500 where available assets 510 are displayed. For ease of use, when an option for an asset 510 is selected 520, it may be noted on the display 500 such as highlighting the selection 520, outlining the selection 520, making the selection 520 flashes, etc. Of course, the selection may be noted in a variety of ways, all of which are contemplated as being part of the system. In addition, the current strike price of interest for the underlying asset may be noted through highlighting 530. The available options may include related available option data for the underlying asset 510. The related available option data may include, but is not limited to, option type, option strike price, option price, duration, number of options to buy or number of options to sell, and expiration date. The available option data may be selectable.

At block 410, a first selection 520 may be selected from the available option data 610. Again, if one of the data 510 is selected, the selection 520 may be noted on the display 600. The selection data 650 may be used as a filter parameter to be applied to the available option data 510. For example, a strike price may be the selection data 520 and the available options and options strategies that incorporate the selection data 520 may be displayed. In some embodiments, if the particular selection data 520 is selected repeatedly in a short period of time, such as in building a traditional strategy using puts/and or calls, a number of the selected data 520 may be indicated. For example, if a call for GE in April 2014 is selected 4 times, available options and option strategies that use 4 calls may be displayed. In addition, in some embodiments, the selection may be of a group such as a group of strike prices.

The selection may occur in a variety of ways. In a traditional computing environment, arrow keys may be used and an enter key may be used to select an item. If the computing device 141 has a mouse as an input device, the mouse may be clicked while hovering over an object to select it. If the computing device 141 has a touch screen interface, the interface may be touched as an input. In addition, various swipes and motion may be used. In additional embodiments, voice recognition technology may be used and the selections may be used by speaking commands to the computing device 141. In yet another embodiment, a digital image device may be part of the computing device and motions by the user may be analyzed and translated into relevant inputs to the computing device 141. In yet another additional environment, a computing device 141 or input device in communication with the computing device 141 may have motion sensors and by moving a motion sensing device, inputs may be made to the computing device 141. In addition, combination of the various input devices and actions may be used assuming the various input devices and methods are supported by the computing device.

At block 415, a first possible group of option strategies 540 may be determined that conforms to the selected option data 520. As is known, certain option strategies use specific options. For example, selecting a strike price in a month may result in determining that a straddle position is possible. Thus, the straddle may be added to the group of possible option strategies 540.

At block 420, if there are a significant number of possible strategies 540, a ranking system may be used to determine the most probable option strategies 540. The ranking system may operate in a variety of ways. In one embodiment, the ranking may be based on user preferences. In other embodiments, statistical data from past trades for the overall market is used to determine the most likely trade. In other embodiments, behavior for a specific customer may be analyzed and the most likely trade for a specific customer may be identified. In yet another embodiment, trades for a specific trader may be reviewed and the most likely trades for a specific trader may be listed. Trades for a particular security also may be analyzed to determine the most likely trade. Logically, a combination of all the data may be analyzed and used to determine the most likely trade.

The analysis may proceed in a variety of ways. For example, the most recent trades may be given a greater weight than trades in the distance past as more recent trades may indicate the current state of the market. In other embodiments, more complex algorithms such as a logarithmic scale may be used to add weights to trades.

At block 425, first strategy prices 550 for the probable first option strategies 540 may be determined. Market data for the options that make up a strategy 540 may be available. For example, if a strategy uses a put and a call at a certain strike price at a certain month, the price for those options (put and call) may be readily available or may be promptly quoted. By adding the prices together for the various options, the price 550 for the strategy may be determined. At block 430, probable first possible option strategies 540 and first strategy prices 550 may be displayed. In some embodiments, the details about the option strategies may be the bare minimum such as a name 540 and price 550.

Figure 6:
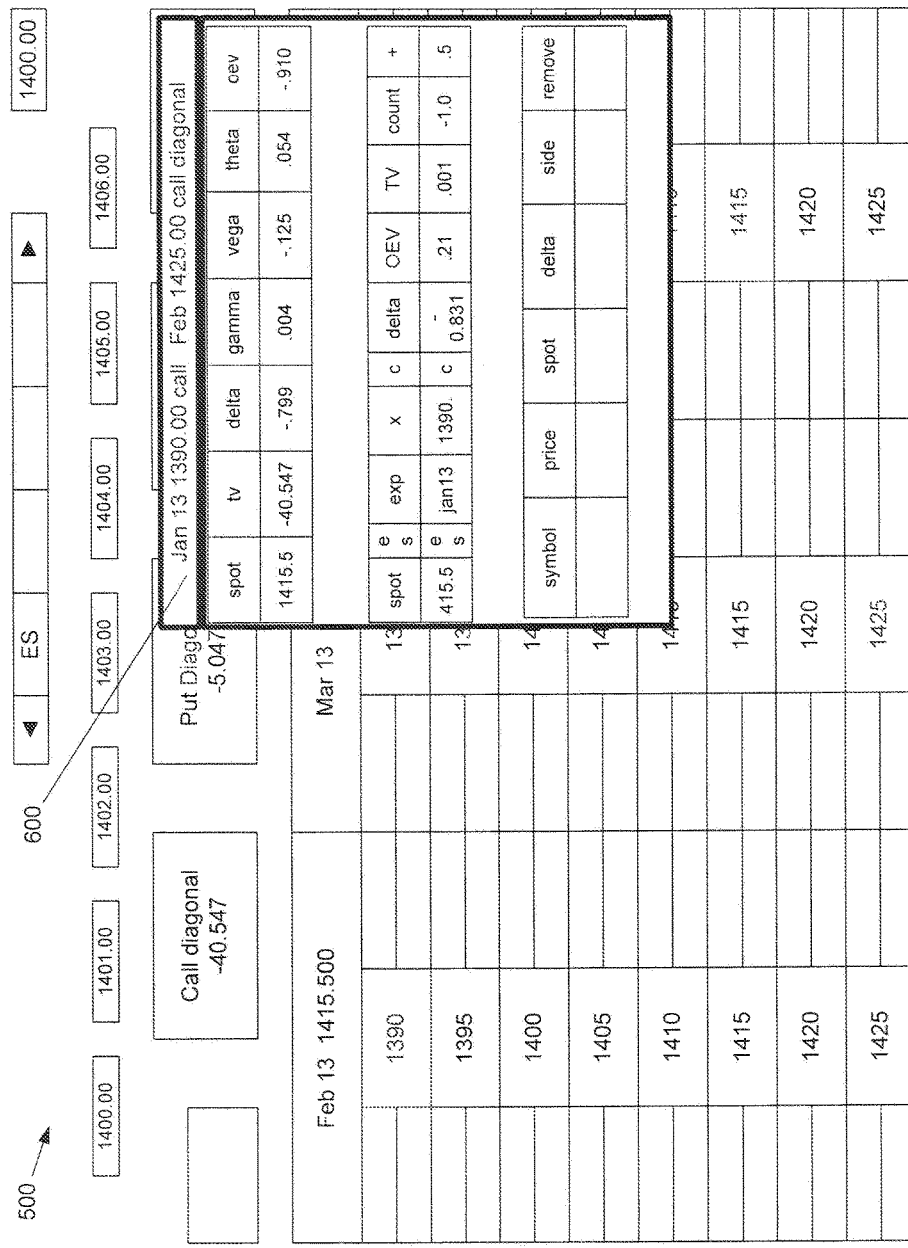
FIG. 6 may be the detailed spread information for a Call diagonal which was selected in FIG. 5.

At block 435, a second selection may be accepted. Logically, the probable first option strategies 540 may be selectable. At block 440, if the second selection is of one of the probable first option strategies, additional information may be displayed about the underlying options of the probable first option strategy in an additional display. If the option strategy 540 is selected, additional strategy data 600 may be displayed about the selected option. FIG. 6 may be an illustration of an additional window that displays additional data about the strategy selected. The additional data 600 may include the spot price related to the option strategy 540, the expiration, the number of options, the price, etc. The additional information about the underlying options of the probable first option strategy may be editable.

At block 445, if the second selection is of one of the available option data 510, a second group of possible option strategies may be determined. The second group of possible option strategies 540 may require the first selection and the second selection. For example, if two strike prices on a month are selected, some strategies may be eliminated if the strategies do not require two strike price. An example of a strategy that requires two strike prices in the same expiration date is a call spread.

At block 450, probable second option strategies 540 may be determined from the second possible option strategies. Again, the probable strategies 540 may be determined using past experience as a guide. The probable strategy may be for the market in general, for a specific trader, for a specific instrument, for a specific customer, etc.

At block 455, second strategy prices 550 for the second possible option strategies 540 may be determined and at block 460 probable second possible option strategies 540 and second strategy prices 550 may be displayed. Logically, the probable second option strategies 540 may be selectable. At any time, a strategy may be stored in a memory for later review. It may appear as a tab or selectable item elsewhere on the display 500.

Logically, additional selections may be received. For example, a third selection may be received. If the third selection is of one of the probable third option strategies, additional information about the underlying options of the probable third option strategy may be displayed such as in the additional window of FIG. 6. If the third selection is of one of the available option data, third possible option strategies may be determined where the third possible option strategy requires the first selection and the second selection and the third selection. From the possible third option strategies, probable third option strategies may be determined. The price for the third probable option strategies may be determined and displayed. Of course, the third probable third option strategies are selectable.

Figure 7:
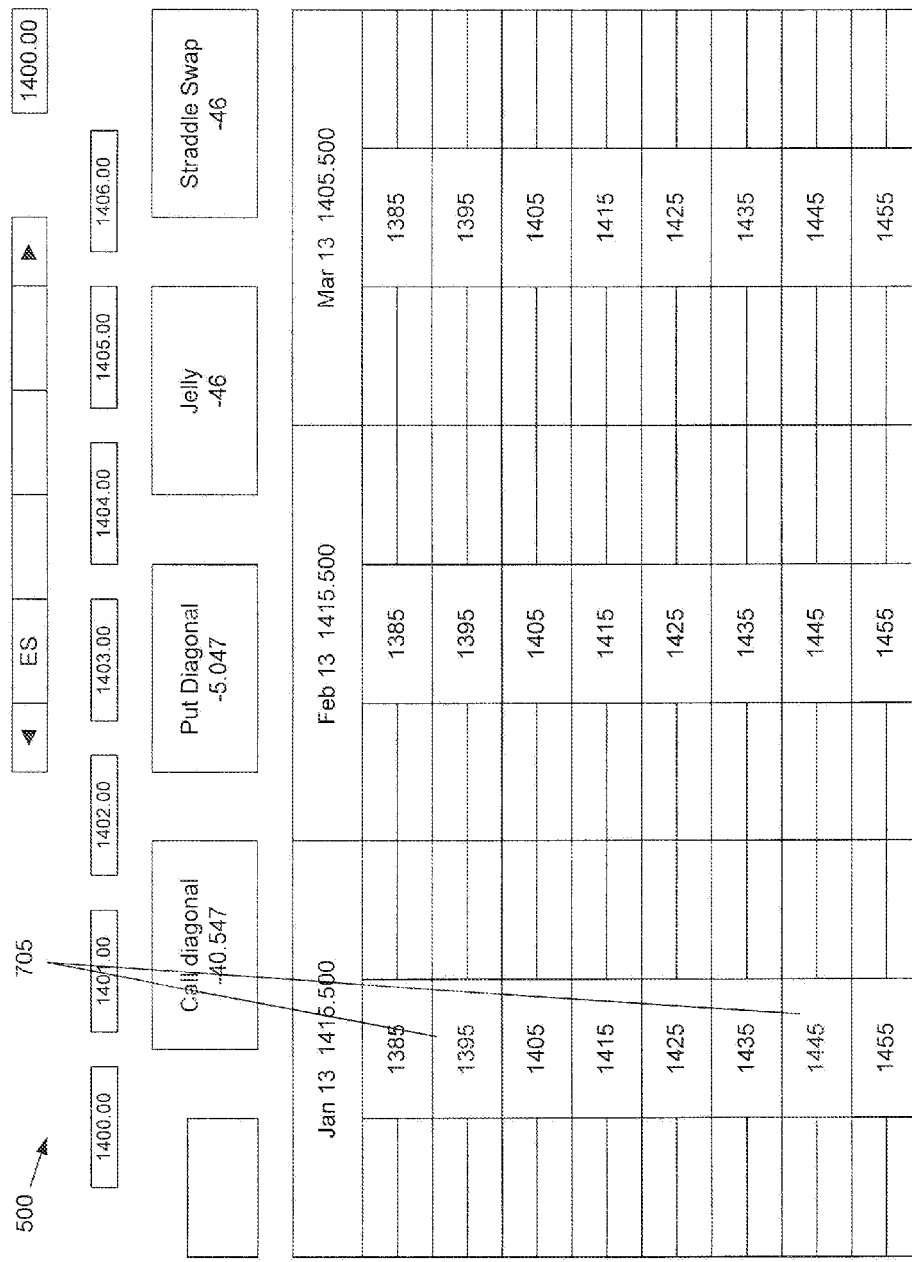
FIG. 7 illustrates the types of spreads (and theoretical values) created when clicking on 2 strikes in the same month.
Figure 8:
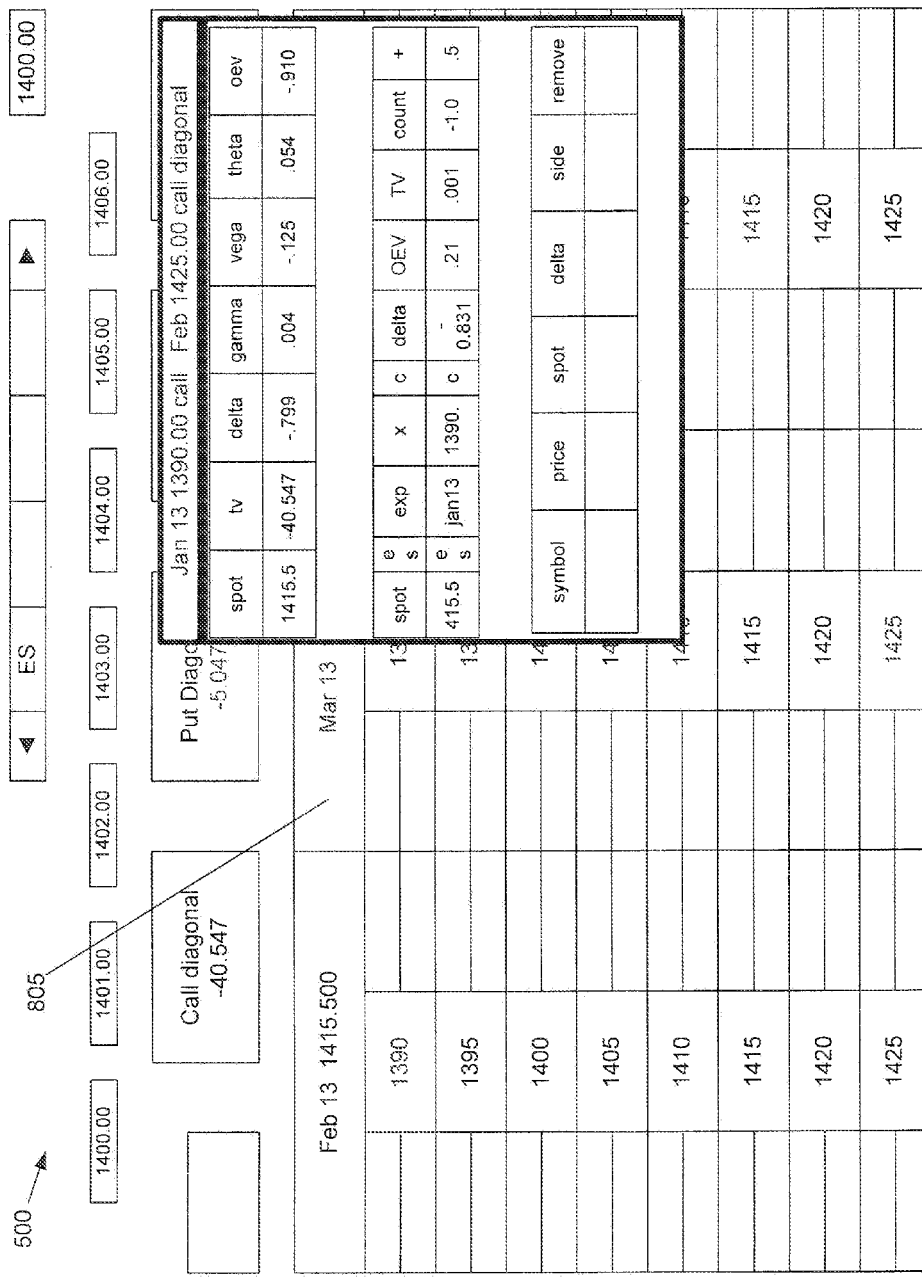
FIG. 8 may be an illustration of a resulting spread information display when "Call Spread" AND "March" month header are selected which creates a strip for the call spread.

Referring to FIG. 5, an example of using the system is illustrated. FIG. 5 illustrates the possible spreads (and theoretical values) at the top when 2 strikes are clicked on in different months. FIG. 6 may be the detailed spread information for a Call diagonal which was selected in FIG. 5. FIG. 7 illustrates the types of spreads (and theoretical values) created when clicking on 2 strikes 705 in the same month. FIG. 8 may be an illustration of a resulting spread information display when "Call Spread" AND "March" month header 805 are selected which creates a strip for the call spread (notice the first 3 month headers are green). This will take the call spread created, find the value of the call spread in February and March as well, add them all up and divide by the number of months (3) to produce a theoretically value. This is a very unique type of spread but is done effortlessly with the system.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A computerized method of determining and presenting likely option strategies based on inputs comprising:
   a. receiving an assets input for processing by a trade processing server wherein the assets input indicating an attribute, said attribute indicating data associated with available options for an underlying asset;
   b. outputting the data associated with the available options based on the attribute via a user interface in a first window, said available options comprising related available option data for the underlying asset wherein the available option data is selectable, wherein the available option data is stored in a memory accessible by the trade processing server;
   c. receiving a first selection from the available option data via the user interface in the first window;
   d. determining via the trade processing server first possible options strategies corresponding to the first selection;
   e. determining via the trade processing server probable first options strategies from a ranking system for the first possible option strategies, said ranking system, being stored in the memory, comprising a ranking based on one or more of the following: user preferences, statistical data from past trades, behavioral data of a customer, trade data of a trader, and trade data of a particular security;
   f. determining via the trade processing server first strategy prices for the probable first option strategies;
   g. outputting determined probable first possible option strategies and the determined first strategy prices via the user interface, wherein the probable first option strategies are selectable;
   h. receiving a second selection via the user interface in the first window;
   i. if the second selection is of one of the probable first option strategies, outputting additional information via the user interface in a second window overlaying the first window about underlying options corresponding to the second selection of the probable first option strategy; and j. if the second selection is of one of the available option data:
   based on attributes including the first selection from the first window and the second selection from the second window, determining via the trade processing server second possible option strategies;
   determining via the trade processing server probable second option strategies from the determined second possible option strategies;
   determining via the trade processing server second strategy prices for the second possible option strategies; and
   outputting via the user interface on the second window probable second possible option strategies and the second strategy prices wherein the probable second option strategies are selectable in the second window.

2. The method of claim 1, further comprising highlighting the data that has been selected.

3. The method of claim 1, further comprising allowing any of the strategies to be stored.

4. The method of claim 1, further comprising
a. receiving a third selection from the second window;
b. If the third selection is of one of the probable first option strategies, outputting via the user interface in the second window overlaying the first window additional information about underlying options corresponding to the third selection of the probable first option strategy;
c. If the third selection is of one of the available option data;
d. based on attributes including the first selection, the second selection, and the third selection, determining via the processor third possible option strategies wherein the third possible option strategy;
e. determining via the trade processing server probable third option strategies from the determined third possible option strategies;
f. Determining via the trade processing server third strategy prices for the third possible option strategies;
g. outputting via the user interface probable third possible option strategies and third strategy prices wherein the probable third option strategies are selectable; and
h. repeating a through g above for subsequent and additional selections.

5. The method of claim 1, wherein available option data comprises option type, option strike price, option price, duration, number of options to buy or number of options to sell, expiration date.

6. The method of claim 1, wherein repeated selection of a selectable item indicates a number or the selectable item.

7. The method of claim 1, where the additional information about the underlying options of the probable first option strategy are editable.

8. The method of claim 1, wherein displaying the first option strategies and second option strategies comprises displaying the option strategies in a predefined order.

9. The method of claim 8, wherein the predefined order is set for a specific user.

10. The method of claim 8, wherein the predefined order is based on the options strategies used most often.

11. The method of claim 8, wherein the predefined order is based on the options strategies used most often by a specific user.

12. A computer system comprising:
a trade processing server physically configured according to computer executable instructions,
a memory physically configured for storing computer executable instructions and an input/output circuit, the computer executable instructions comprising instructions for determining and presenting likely option strategies to a graphical user interface (GUI) based on inputs, said memory being accessible by the trade processing server, the instructions comprising instructions for:
a. receiving an assets input for processing by the processor wherein the assets input indicating an attribute via a user interface, said attribute indicating data associated with available options for an underlying asset;
b. outputting via a user interface in a first window the data associated with the available options based on the attribute, said available options comprising related available option data for the underlying asset wherein the available option data is selectable, wherein the available option data is stored in the memory;
c. receiving a first selection from the available option data via the first window;
d. determining via the trade processing server first possible options strategies that conforms to the selected option data;
e. determining via the trade processing server probable first options strategies from a ranking system for the first possible option strategies, said ranking system comprising a ranking based on one or more of the following: user preferences, statistical data from past trades, behavioral data of a customer, trade data of a trader, and trade data of a particular security;
f. determining via the trade processing server first strategy prices for the probable first option strategies;
g. outputting determined probable first possible option strategies and the first strategy prices via the user interface, wherein the probable first option strategies are selectable;
h. receiving a second selection via the user interface in the first window;
i. If the second selection is of one of the probable first option strategies, outputting via the user interface in a second window overlaying the first window additional information about underlying options corresponding to the second selection of the probable first option strategy in an additional display;
j. If the second selection is of one of the available option data:
   based on attributes including the first selection from the first window and the second selection from the second window, determining via the trade processing server second possible option strategies;
   determining via the trade processing server probable second option strategies from the determined second possible option strategies;
   determining via the trade processing server second strategy prices for the second possible option strategies; and
   outputting via the user interface on the second window probable second possible option strategies and the second strategy prices wherein the probable second option strategies are selectable in the second window.

13. The computer system of claim 12, further comprising computer executable instructions for highlighting the data that has been selected.

14. The computer system of claim 12, further comprising computer executable instructions for allowing any of the strategies to be stored.

15. The computer system of claim 12, further comprising computer executable instructions for:
   a. receiving a third selection from the second window;
   b. If the third selection is of one of the probable first option strategies, outputting via the user interface in the second window overlaying the first window additional information about underlying options corresponding to the third selection of the probable first option strategy;
   c. If the third selection is of one of the available option data;
   d. based on attributes including the first selection, the second selection, the third selection, determining via the processor third possible option strategies wherein the third possible option strategy;
   e. determining via the trade processing server probable third option strategies from the determined third possible option strategies;
   f. determining via the trade processing server third strategy prices for the third possible option strategies;
   g. outputting via the user interface probable third possible option strategies and third strategy prices wherein the probable third option strategies are selectable; and
   h. repeating a through g above for subsequent and additional selections.

16. The computer system of claim 12, wherein available option data comprises option type, option strike price, option price, duration, number of options to buy or number of options to sell, expiration date.

17. The computer system of claim 12, wherein repeated selection of a selectable item indicates a number or the selectable item.

18. The computer system of claim 12, where the additional information about the underlying options of the probable first option strategy are editable.

19. The computer system of claim 12, wherein displaying the first option strategies and second option strategies comprises computer executable instructions for displaying the option strategies in a predefined order.

20. The computer system of claim 12, wherein the predefined order is set for at least one of:
   a. specific user;
   b. a specified asset;
   c. a specified customer; and
   d. a specified marker.

* * * * *